(12) United States Patent
Lamping et al.

(10) Patent No.: US 9,614,377 B2
(45) Date of Patent: Apr. 4, 2017

(54) AIRCRAFT TIRE PRESSURE SENSOR RESONANT LOOP LINK

(71) Applicant: ELDEC CORPORATION, Lynwood, WA (US)

(72) Inventors: Jeff Lamping, Snohomish, WA (US); Igal Goniodsky, Kirkland, WA (US)

(73) Assignee: ELDEC CORPORATION, Lynwood, WA (US)

( * ) Notice: Subject to any disclaimer, the term of this patent is extended or adjusted under 35 U.S.C. 154(b) by 459 days.

(21) Appl. No.: 14/469,087

(22) Filed: Aug. 26, 2014

(65) Prior Publication Data

US 2015/0008759 A1    Jan. 8, 2015

Related U.S. Application Data

(63) Continuation-in-part of application No. 14/285,111, filed on May 22, 2014, now Pat. No. 9,061,553, which is a continuation of application No. 13/647,219, filed on Oct. 8, 2012, now Pat. No. 8,736,466, which is a continuation of application No. 13/289,555, filed on Nov. 4, 2011, now Pat. No. 8,305,237, which is a continuation of application No.
(Continued)

(51) Int. Cl.
| | |
|---|---|
| *G08B 21/00* | (2006.01) |
| *H02J 5/00* | (2016.01) |
| *G01L 17/00* | (2006.01) |
| *B60C 23/04* | (2006.01) |

(52) U.S. Cl.
CPC ............ *H02J 5/005* (2013.01); *B60C 23/043* (2013.01); *B60C 23/0413* (2013.01); *G01L 17/00* (2013.01)

(58) Field of Classification Search
USPC ....................... 307/104; 340/945, 568.1, 444
See application file for complete search history.

(56) References Cited

U.S. PATENT DOCUMENTS

| | | |
|---|---|---|
| 4,389,884 A | 6/1983 | Agulia et al. |
| 4,724,389 A | 2/1988 | Hyde et al. |

(Continued)

FOREIGN PATENT DOCUMENTS

WO    2013149187 A1    10/2013

OTHER PUBLICATIONS

International Search Report, May 20, 2009, 2 pages.
(Continued)

*Primary Examiner* — Danny Nguyen
(74) *Attorney, Agent, or Firm* — Fulwider Patton LLP

(57) ABSTRACT

The aircraft tire pressure resonant loop link assembly electromagnetically couples a magnetic field between a wheel axle electromagnetic adapter transformer primary coil and a tire pressure sensor receiver coil for powering a tire pressure sensor, and includes a pair of spaced apart electrically conductive connecting arms, a single electrically conductive primary loop electrically connected to first ends of the connecting arms mounted adjacent to a secondary tire pressure sensor coil, and a circuit including a resonant tuning capacitor and a secondary coil with one or more electrically conductive loops at second ends of the connecting arms. The tire pressure sensor coil pair includes a transformer core, and secondary resonant coil pair also includes a transformer core.

20 Claims, 12 Drawing Sheets

Related U.S. Application Data

12/409,432, filed on Mar. 23, 2009, now Pat. No. 8,059,014.

(60) Provisional application No. 61/038,556, filed on Mar. 21, 2008.

(56) References Cited

U.S. PATENT DOCUMENTS

| | | |
|---|---|---|
| 5,231,391 A | 7/1993 | Rigaux et al. |
| 5,853,020 A | 12/1998 | Widner et al. |
| 6,839,035 B1 | 1/2005 | Addonisio |
| 6,889,543 B2 | 5/2005 | Gautier |
| 7,202,778 B2 | 4/2007 | Buenz et al. |
| 7,397,353 B2 | 7/2008 | Myhre et al. |
| 7,497,137 B2 | 3/2009 | Tellenbach et al. |
| 8,059,014 B2 | 11/2011 | Lamping et al. |
| 8,305,237 B2 | 11/2012 | Lamping et al. |
| 8,573,047 B2 | 11/2013 | Finefrock |
| 2002/0190853 A1 | 12/2002 | Nigon et al. |
| 2005/0046558 A1* | 3/2005 | Buenz ................ B60C 23/0428 340/445 |
| 2005/0099283 A1 | 5/2005 | Johnson et al. |
| 2005/0179529 A1 | 8/2005 | Sato |
| 2005/0264406 A1 | 12/2005 | Myhre et al. |
| 2008/0084331 A1 | 4/2008 | Pradier et al. |

OTHER PUBLICATIONS

Chinese Search Report, Mar. 15, 2016, 1 page, from App. No. 2013800180474.
International Search Report, Nov. 13, 2015, 3 pages, from PCT/US2015/046521.

\* cited by examiner

AIRCRAFT TIRE PRESSURE SENSOR RESONANT LOOP LINK

CROSS-REFERENCES TO RELATED APPLICATIONS

This application is a continuation-in-part of application Ser. No. 14/285,111, filed May 22, 2014, which is a continuation of application Ser. No. 13/647,219, filed Oct. 8, 2012, which is a continuation of application Ser. No. 13/289,555, filed Nov. 4, 2011, U.S. Pat. No. 8,305,237, issued Nov. 6, 2012, which is a continuation of U.S. Nonprovisional application Ser. No. 12/409,432 filed Mar. 23, 2009, U.S. Pat. No. 8,059,014, issued Nov. 15, 2011, which claims priority to and is based upon Provisional Application No. 61/038,556, filed Mar. 21, 2008.

BACKGROUND

This invention relates generally to vehicle tire pressure control systems, and more particularly relates to a system for transmitting power to an aircraft tire pressure sensor from a control unit associated with a wheel hub and transmitting data between the aircraft tire pressure sensor and the control unit. The invention pertains more specifically to a communication link between a tire pressure sensor on a wheel rim and a wheel hub axle transformer for communication with control electronics, particularly for aircraft.

It is useful in an airplane to measure the pressure of each tire with a tire pressure sensor on a wheel rim, and display the tire pressure sensor information in the cockpit. It is necessary to communicate this information from the tire pressure sensor on the wheel rim to a wheel hub axle transformer, from the wheel hub axle transformer to an electronics interface circuit located in an electronics bay of the aircraft inside the pressurized vessel, which can typically be up to about 250 feet away from the tire pressure sensor, and then from the electronics bay to the cockpit.

One known tire pressure system uses a pair of transformer coils to communicate between a primary and secondary coil in the wheel axle. These transformers are coaxial and face each other. A length of wire connected to the secondary of the transformer pair connects directly with the tire pressure sensor that is located on the periphery of the wheel rim. Another known device for enhancing the magnetic coupling in a RFID wireless communication system includes first and second antenna coils connected together by electrical connectors in a closed loop and formed on a flexible substrate that can be folded around a magnetic flux blocker to avoid magnetic interference from the magnetic flux blocker.

However, it is desirable to provide communication between an airplane wheel hub and a tire pressure sensor located on the rim of the wheel up to nine inches away from the wheel hub without using electrical connections that can be unreliable and easily be broken in a harsh airplane wheel environment. It is thus desirable to provide a non-contact method of communication between an airplane wheel hub and a tire pressure sensor located on the rim of the wheel that does not require electrical connections or a length of wire to communicate between the wheel hub and the tire pressure sensor.

A magnetically coupled antenna range extender is also known that is structured to be interposed between an RF antenna and an electronic device from 0.5 to 5 centimeters from the RF antenna or the electronic device, for extending the operating range of communication between the RF antenna and the electronic device. The antenna range extender includes a passive series tuned resonate circuit that must be tuned to resonate substantially at the frequency of an RF signal radiated by the RF antenna. The passive series tuned resonate circuit can be formed by an open loop coil of an electrical conductor, with a capacitor connected in series and completing the circuit. However, it has been found that an electromotive force can be induced in such a loop by stray magnetic flux that can generate an electric current that can interfere with a desired signal being conducted.

A passive radio-frequency transmission device for increasing the transmission efficiency of radio-frequency systems is also known that includes a transmission antenna, a receiving antenna, and one or more passive resonant circuits positioned between the transmission and receiving antennas.

A need therefore remains to reduce the cost of the device that links the two coils, and to reduce the complexity of the device that links the magnetic field, in a manner that avoids the generation of signal interference, the use of unreliable electrical connections, and the use wires for electrical connections, which can easily break in the harsh environment of the airplane wheel.

It would be desirable to provide such a system that minimizes the use of direct electrical connections or a length of wire to communicate tire pressure sensor information between a wheel hub coil and a tire pressure sensor at the edge of the tire rim from an electronics interface circuit card that is located up to 250 feet away from the wheel. It would be desirable for such a system to require no more than a single turn of stamped sheet metal to couple enough magnetic flux to power and communicate with a tire pressure sensor receiver coil. It would be desirable for such a system to be substantially symmetric, with a coaxial arrangement of an axle transformer coil pair to avoid interference from airplane axle and wheel vibration. It also would be desirable for such a system to allow a sensitive electronics interface circuit card to be placed a sufficient distance away from airplane axle and wheel vibration in a benign environment of an aircraft electronics bay, typically inside a pressurized and temperature controlled vessel, for example.

It would be desirable for such a system to provide communication and power transfer through a magnetic field coupling the tire pressure sensor and the wheel axle coil. It would be desirable for such a system to be a resonant link requiring a single capacitance value for a resonant tuning capacitor, to allow such a system to work with up to 250 feet of aircraft cabling, so that the electronics interface card can work with any aircraft size or wheel configurations. The present invention fills these and other needs.

SUMMARY OF THE INVENTION

Briefly and in general terms, the invention provides for an aircraft resonant loop link assembly for electromagnetically coupling a magnetic field between a wheel axle electromagnetic adapter transformer primary coil and a tire pressure sensor receiver coil that does not use unreliable electrical connections and does not use wires that are otherwise prone to breaking in the harsh environment of the airplane wheel.

Accordingly, the present invention provides for an aircraft resonant loop link assembly for electromagnetically coupling a magnetic field between a wheel axle electromagnetic adapter transformer primary coil and a tire pressure sensor receiver coil spaced apart from the wheel axle electromagnetic adapter transformer primary coil for powering a tire pressure sensor. The aircraft resonant loop link assembly includes a first electrically conductive connecting arm, a second electrically conductive connecting arm spaced apart from the first electrically conductive connecting arm, a single electrically conductive primary loop electrically connected to first ends of the first and second electrically conductive connecting arms. In a presently preferred aspect, the first and second electrically conductive connecting arms are parallel. In another presently preferred aspect, the first and second electrically conductive connecting arms are separated by a small gap. In another presently preferred aspect, the first and second electrically conductive connecting arms are rigid. In another presently preferred aspect, the first and second electrically conductive connecting arms are each formed of a plurality of stepped sections. In another presently preferred aspect, the first and second electrically conductive connecting arms are formed of a metal, and preferably a metal having low magnetic permeability, such as aluminum or titanium, for example.

In another presently preferred aspect, the single electrically conductive primary loop is configured to be mounted adjacent to a secondary tire pressure sensor coil. The aircraft resonant loop link assembly also includes a circuit including at least one resonant tuning capacitor and a secondary coil including at least one electrically conductive loop electrically connected to second ends of the first and second electrically conductive connecting arms. The second ends of the first and second electrically conductive connecting arms are connected in series to the circuit, and the secondary coil is preferably configured to be mounted adjacent to a wheel axle electromagnetic adapter transformer primary coil. In another presently preferred aspect, the at least one electrically conductive loop of the secondary coil may be formed of two conductive loops or three conductive loops, for example, and the at least one electrically conductive loop of the secondary coil may be formed of metal.

In another presently preferred aspect, the first and second electrically conductive connecting arms are electrically connected between the single electrically conductive primary loop and the secondary coil. In another presently preferred aspect, the first and second electrically conductive connecting arms are configured to carry current generated in the secondary coil from the wheel axle electromagnetic adapter transformer primary coil to the secondary coil, and the first and second electrically conductive connecting arms are configured to carry current induced in the primary loop a predetermined distance from the wheel axle electromagnetic adapter transformer primary coil to the secondary coil, in order to generate flux in the tire pressure sensor receiver coil for powering a tire pressure sensor.

In another presently preferred aspect, the electrically conductive primary loop is formed of metal. In another presently preferred aspect, the electrically conductive primary loop and the secondary tire pressure sensor coil form a tire pressure sensor coil pair, and the tire pressure sensor coil pair preferably includes a transformer core disposed between the electrically conductive primary loop and the secondary tire pressure sensor coil. In another presently preferred aspect, the transformer core is formed of magnetically permeable material.

In another presently preferred aspect, the at least one electrically conductive loop of the secondary coil and the wheel axle electromagnetic adapter transformer primary coil together form a resonant coil pair, and the resonant coil pair is electrically connected with a control electronics unit. In another presently preferred aspect, a transformer core is disposed in the resonant coil pair between the at least one electrically conductive loop of the secondary coil and the wheel axle electromagnetic adapter transformer primary coil. The transformer core disposed in the resonant coil pair is preferably formed of magnetically permeable material.

These and other aspects and advantages of the invention will become apparent from the following detailed description and the accompanying drawings, which illustrate by way of example the features of the invention.

DETAILED DESCRIPTION OF THE PREFERRED EMBODIMENTS

While primary and secondary transformer coils have been used to communicate between a tire sensor and a wheel axle to convey tire pressure information through the wheel axle, with a length of wire connecting the secondary coil directly with the tire pressure sensor, this has proved unreliable in communicating between an airplane wheel hub and a tire pressure sensor located on the rim of the wheel up to nine inches away from the wheel hub as is needed, particularly since electrical connections that can be unreliable and easily be broken in a harsh airplane wheel environment.

A tire pressure monitor system was developed in which an electronics unit located in the hub of the wheel communicates with a tire pressure sensor near the rim of the wheel using a magnetic field. A coil centered on the wheel axle and located on the hub of the wheel produces the magnetic field. This magnetic field can be coupled to a tire pressure sensor receiver coil using a length of thin and highly permeable multilayer and laminated metal structure to couple flux from the edge of the wheel hub coil out to the periphery of the wheel rim where the receiver coil of the tire pressure sensor is located. Information can be transferred to and from the tire pressure sensor through this magnetic field coupling the two coils. However, the high permeability of the metal flux link couples a fraction of the total flux out to the length of material and into the tire pressure sensor coil. Communication is not possible using this magnetic field alone because the magnetic field strength is not strong enough to power up the tire pressure sensor.

Figure 1:
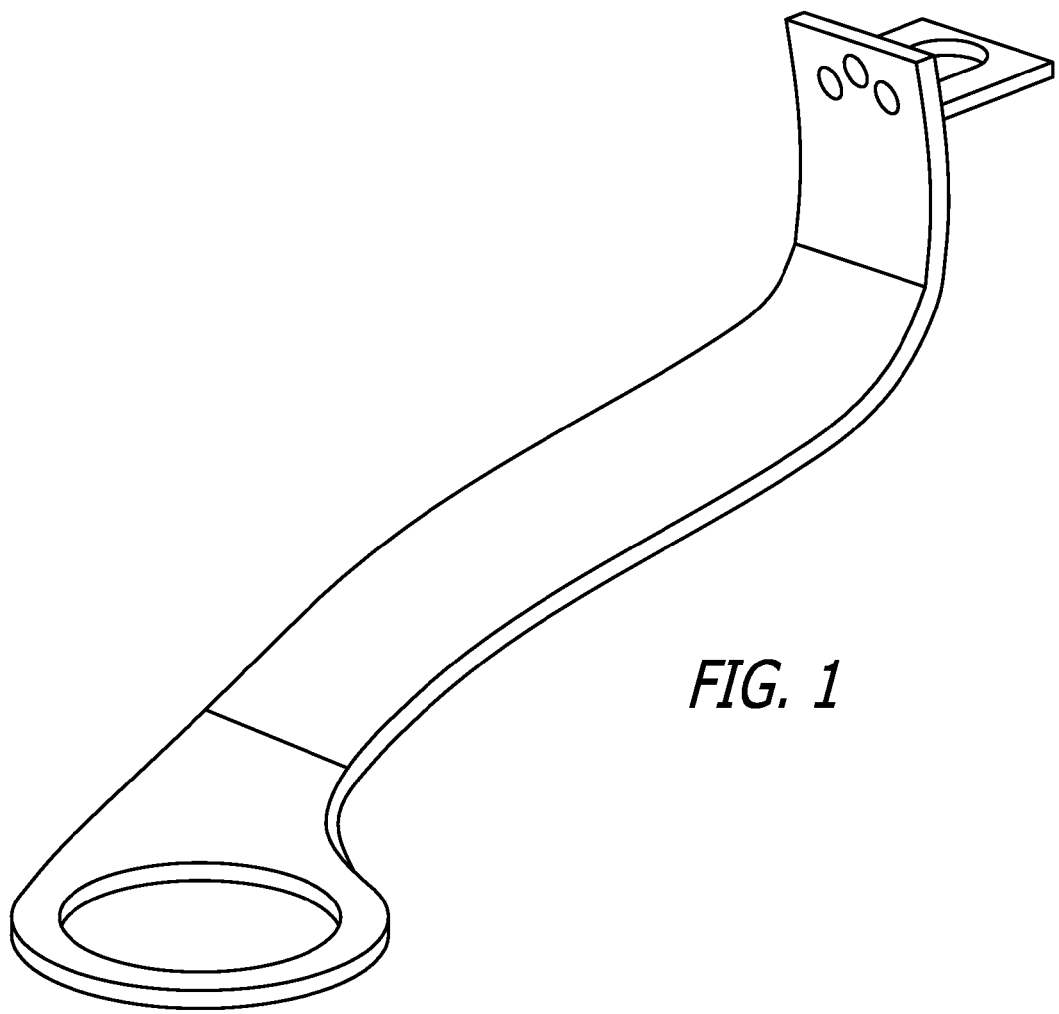
FIG. 1 is a perspective view of a highly permeable multi-layer and laminated metal flux link.
Figure 2A:
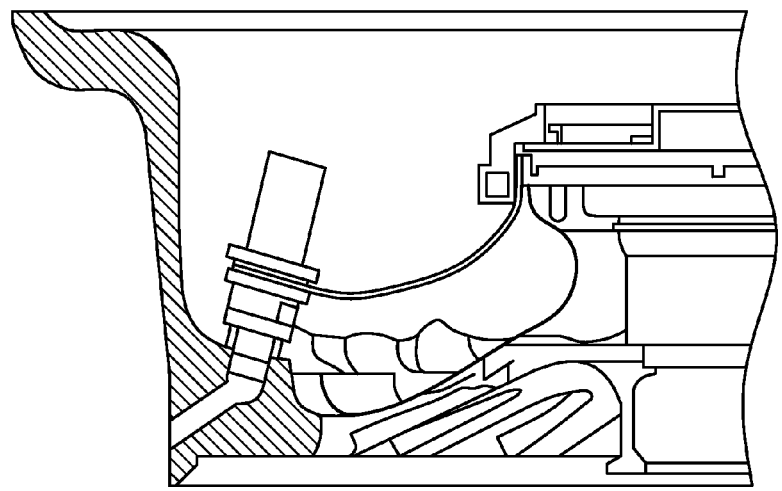
FIG. 2A shows partial views illustrating the mounting of the flux link of FIG. 1 in an aircraft wheel electromagnetically connecting a wheel hub to a tire pressure sensor.
Figure 2B:
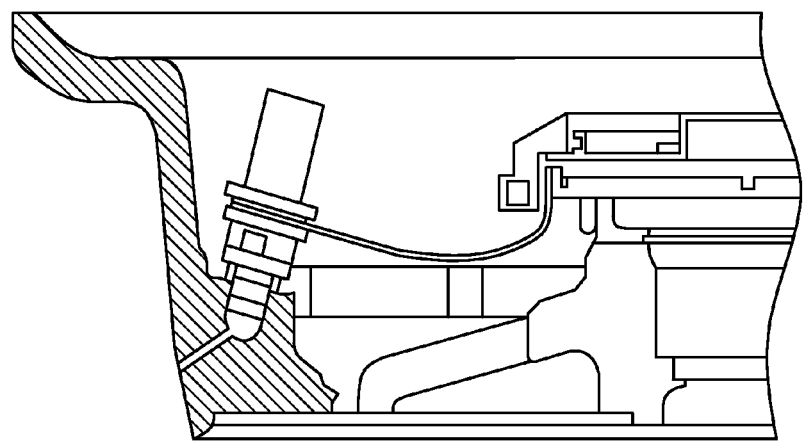
FIG. 2B shows partial views illustrating the mounting of the flux link of FIG. 1 in another aircraft wheel electromagnetically connecting a wheel hub to a tire pressure sensor.

One method of increasing the strength of the magnetic field is to insert a magnetic field coupling device between the edge of the wheel hub coil and the tire pressure sensor coil. One approach to enhance the coupled magnetic field is to collect flux with a highly permeable magnetic metal strip. This strip can be called a flux link, and is shown in FIG. 1. A diagram of the flux link installed in a Messier-Bugatti airplane wheel is shown in FIG. 2A, and a diagram of the flux link installed in a Goodrich airplane wheel is shown in FIG. 2B. The permeable magnetic metal strip couples flux about four inches down the flux link to the tire pressure sensor body. The permeable body of the tire pressure sensor further couples the flux up through the tire pressure sensor receiver coil. Because the frequency of operation is so high (135 KHz), the permeable metal object must be many layers of a very thin (0.004 inch) magnetic material to keep the losses caused by eddy currents low. One implementation of the design required 10 insulated layers of the thin and highly permeable magnetic material. The use of such a large number of layers of such thin and highly permeable magnetic materials results in a high complexity and a high cost to provide sufficient magnetic field strength to allow transfer of information to and from the tire pressure sensor through such a magnetic field coupling.

A tire pressure monitor system for magnetically transferring a wheel hub magnetic field through a thin and highly permeable multilayer laminated metal structure typically only couples a fraction of the magnetic flux over the distance between a wheel axle coil and a tire pressure sensor coil, and typically is not strong enough to power up a tire pressure sensor sufficiently for purposes of communication of information from the tire sensor, because of the low magnetic field strength available; and a similar system utilizing a highly permeable magnetic metal flux link utilizing many layers of thin and highly permeable magnetic materials results in high complexity and costs of production.

Accordingly, in one embodiment, the present invention provides for an improved method and system for coupling a magnetic field between a wheel hub coil and a tire pressure sensor coil that reduces the cost of the device that links the two coils, and reduces the complexity of the device that links the magnetic field, without using unreliable electrical connections and wires that can easily break in the harsh environment of the airplane wheel. An example of the aircraft tire pressure loop link of the invention is illustrated in FIGS. 3-8.

Figure 3:
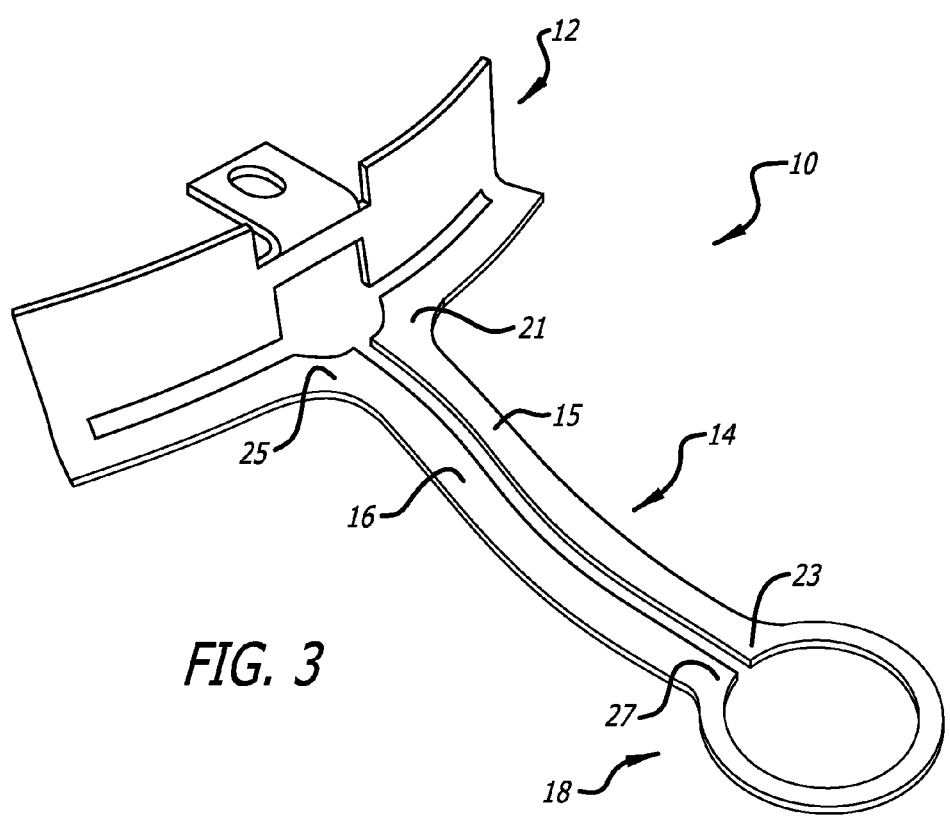
FIG. 3 is a perspective view of an aircraft tire pressure loop link described herein.
Figure 4:
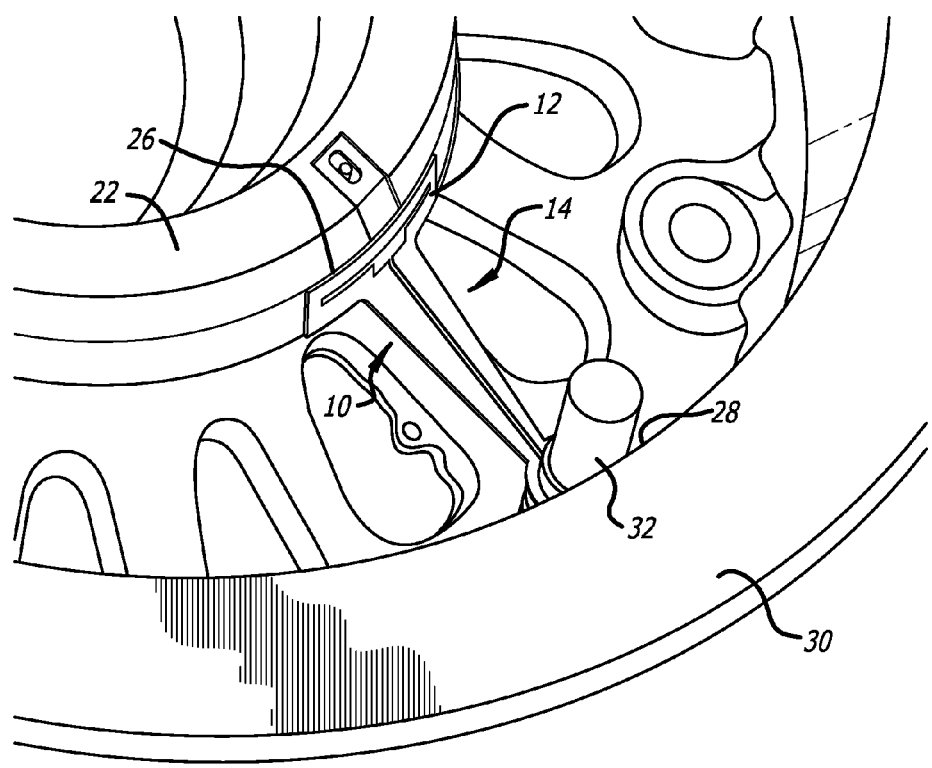
FIG. 4 is a perspective view illustrating the mounting of the aircraft tire pressure loop link of FIG. 3 in an aircraft wheel, electromagnetically connecting a wheel hub to a tire pressure sensor.
Figure 5:
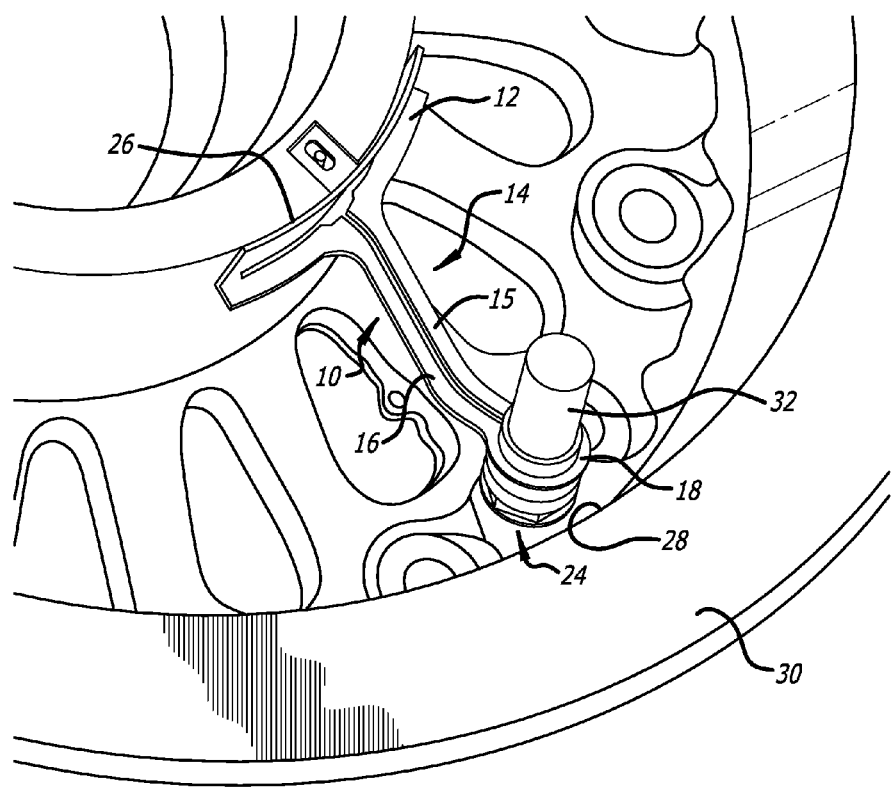
FIG. 5 is another perspective view similar to FIG. 4, illustrating the mounting of the aircraft tire pressure loop link of FIG. 3 in an aircraft wheel, electromagnetically connecting a wheel hub to a tire pressure sensor.
Figure 6:
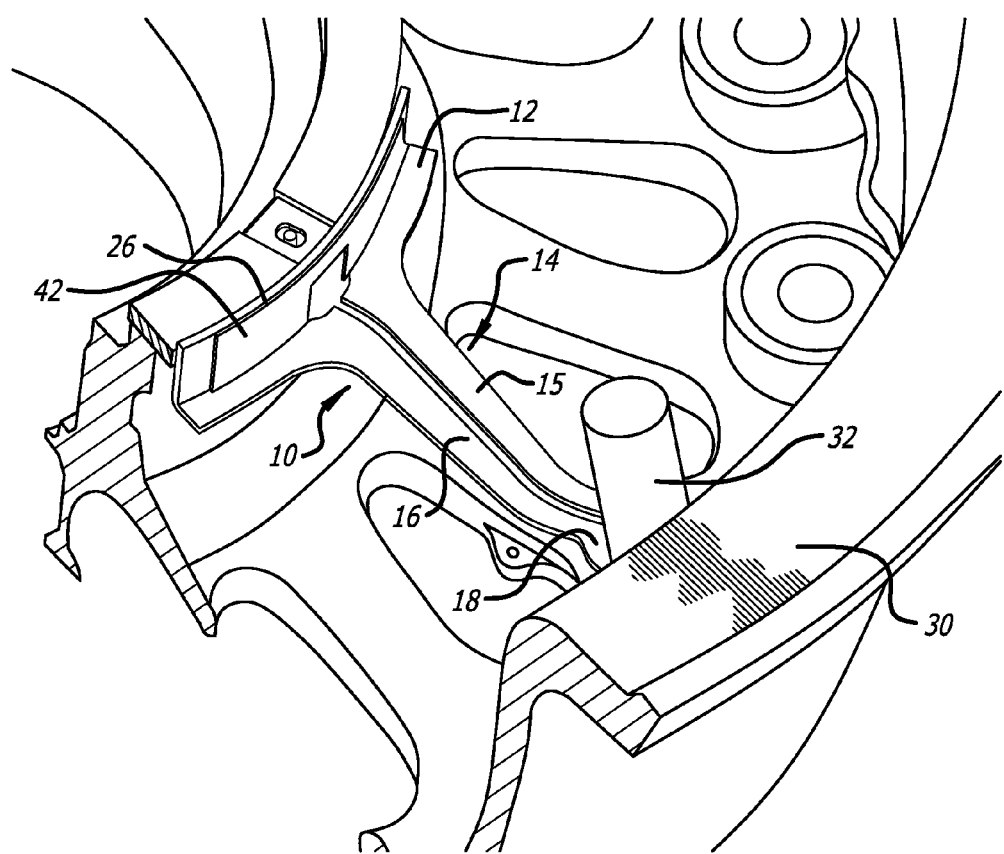
FIG. 6 is another perspective view similar to FIG. 4, illustrating the mounting of the aircraft tire pressure loop link of FIG. 3 in an aircraft wheel, electromagnetically connecting a wheel hub to a tire pressure sensor.

The invention is advantageous in that it does not use a pair of wires to electrically connect the axle wheel coil with the tire pressure sensor receiver coil. The aircraft tire pressure loop link 10 of the invention is typically formed as a rigid first or primary single metal loop 12, a rigid pair of spaced apart electrically conductive connecting arms 14, typically including parallel spaced apart metal shafts 15, 16, and a rigid second or secondary single metal loop 18. The parallel spaced apart metal shafts are preferably closely spaced apart by a small gap, to minimize their loop area. The pair of spaced apart electrically conductive connecting arms is rigidly electrically connected between the first or primary single metal loop and the second or secondary single metal loop. As is illustrated in FIG. 3, the shaft 15 of the pair of spaced apart electrically conductive connecting arms is rigidly electrically connected between a first portion 21 of the first or primary single metal loop 12 and a first portion 23 of the second or secondary single metal loop 18, and the shaft 16 is rigidly electrically connected between a second portion 25 of the first or primary single metal loop 12 and a second portion 27 of the second or secondary single metal loop 18. The first or primary single metal loop is configured to be mounted adjacent to an electromagnetic transceiver drive coil 20, illustrated in FIG. 8, of a wheel axle 22, and the second single metal loop is configured to be mounted adjacent to a tire pressure sensor transceiver coil 24. The current induced in the first or primary single metal loop travels the distance from the edge 26 of the wheel axle transceiver drive coil to the periphery 28 of the wheel rim 30 to the second single metal loop, which generates the flux in the tire pressure sensor receiver coil necessary to power a tire pressure sensor 32.

The aircraft tire pressure loop link of the invention can be made from a variety of metallic materials, such as low magnetically permeable metals, including aluminum or titanium, for example, that are readily available, and it is not necessary to use a highly magnetically permeable metal to couple flux over the needed distance. The pair of spaced apart electrically conductive connecting arms can be made of any desirable length without loss of coupling enhancement between a wheel axle electromagnetic transceiver drive coil and a tire pressure sensor transceiver coil. The flux is linked in one turn of a metal loop and the current induced in the loop travels the distance from the edge of the wheel axle coil to the periphery of the of the wheel rim, where the second single loop of metal generates the flux in the tire pressure sensor receiver coil. The aircraft tire pressure loop link of the invention advantageously provides a low impedance electromagnetic signal path connection between a wheel axle electromagnetic transceiver drive coil and a tire pressure sensor transceiver coil, so that no electrical insulation is required over the pair of connecting arms of the loop link. In addition, the aircraft tire pressure loop link of the invention advantageously provides a low voltage electromagnetic signal path connection between the wheel axle electromagnetic transceiver drive coil and the tire pressure sensor transceiver coil, so that the loop link is not a source of electric field radiation and is not sensitive to electric field interference. The aircraft tire pressure loop link of the invention also advantageously can typically be an intrinsically rigid, self-supporting structural part, not requiring any additional means of support.

Figure 7:
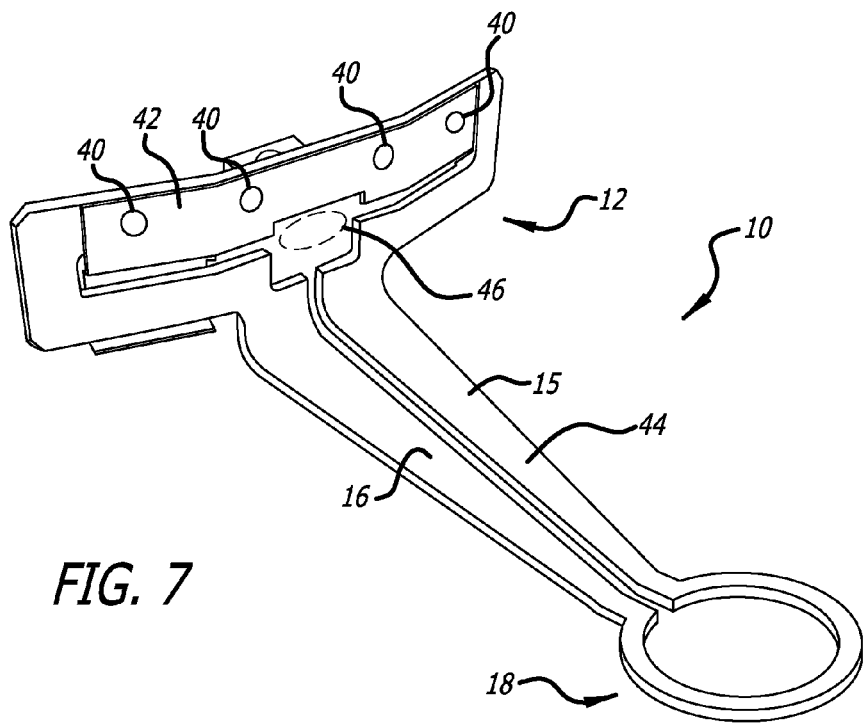
FIG. 7 is a front perspective view of the aircraft tire pressure loop link of FIG. 3.

FIG. 7 shows a drawing of the loop link of the present invention. Item 40 is an aluminum rivet. Item 42 indicates a highly permeable magnetic flux collector insert member typically electrically connected and attached to the first or primary single metal loop, such as by aluminum rivets, for example. Item 44 is a piece of aluminum sheet metal bent into shape. The magnetic flux collector insert member 42 provides a means of collecting an impinging magnetic flux from the wheel axle electromagnetic transceiver drive coil, and then concentrating and directing that magnetic flux through an area 46 of a central portion of the cross sectional area enclosed by the upper first or primary single metal loop 12. This greatly enhances the coupling efficiency of the loop link of the invention, by allowing a greater portion of the flux from the wheel axle electromagnetic transceiver drive coil to pass through the first or primary single metal loop as if the first or primary single metal loop were physically much larger. The magnetic flux collector insert member 42 is typically formed of a highly permeable magnetic metal, such as a nickel-iron-molybdenum alloy sold under the trademark HYMU-80, or a nickel-iron magnetic alloy sold under the trademark PERMALLOY.

Figure 8:
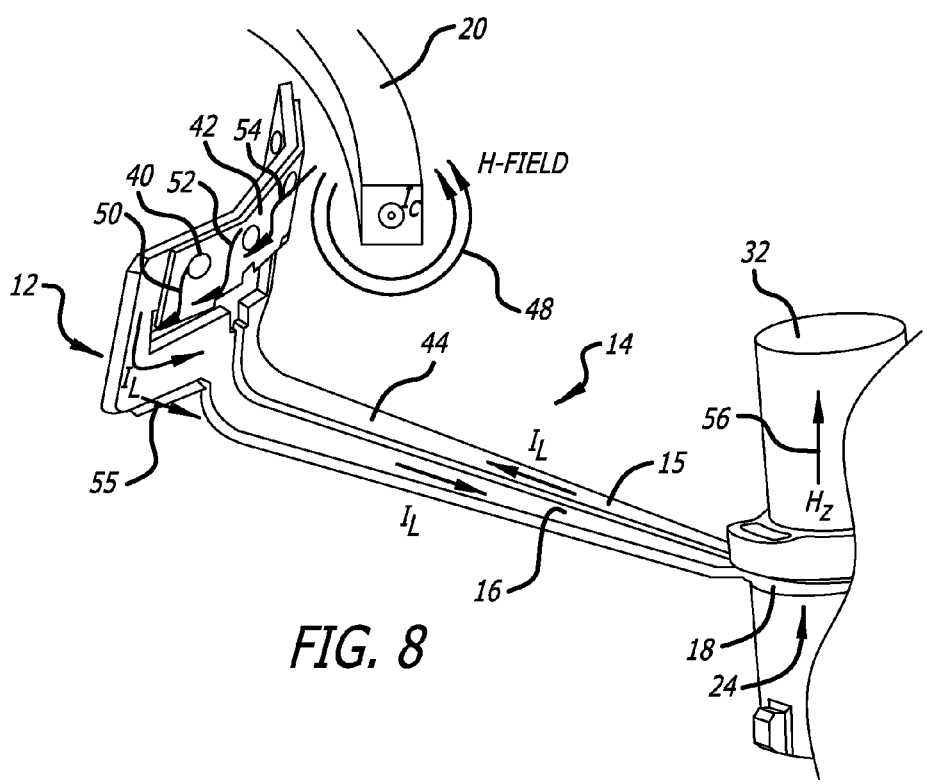
FIG. 8 is a functional, schematic diagram of the aircraft tire pressure loop link of FIG. 3 mounted in an aircraft wheel, illustrating the principles of operation of the aircraft tire pressure loop link.

FIG. 8 shows a functional, schematic diagram of the loop link of the present invention. The electromagnetic transceiver drive coil 20 is excited with an alternating current, $I_C$, typically at a frequency with any desired RFID frequency band. The current $I_C$ is shown flowing out of the paper. A magnetic field is produced that circles the electromagnetic transceiver drive coil 20 and is shown by flux lines 48. Some of this magnetic field 48 is coupled by the highly permeable magnetic metal of the magnetic flux collector insert member 42 and is shown as flux lines 50, 52 and 54. The flux is coupled through the cross sectional area 46 of the upper first or primary loop 12, as shown in FIG. 7. This sinusoidal flux induces a current ($I_L$) in the aluminum pair of spaced apart electrically conductive connecting arms 14 formed by the first and second parallel spaced apart metal shafts, items 15, 16. The current $I_L$ flows down the pair of spaced apart electrically conductive connecting arms 14 to a smaller, lower second or secondary single metal loop 18, and returns via the pair of spaced apart electrically conductive connecting arms 14 to the larger upper first or primary single metal loop 12. In the smaller, lower second or secondary single metal loop 18, the sinusoidal current generates a magnetic field shown as flux line 56 that excites the tire pressure sensor 24 located in that field.

The physics involved is determined by Ampere's circuital law. The circulation of the magnetic field intensity around any closed path is equal to the free current flowing through the surface bounded by the path. The closed path is the pair of spaced apart electrically conductive connecting arms 14 formed by the parallel spaced apart metal shafts 15, 16 of aluminum. If a magnetic field is directed through the cross sectional area enclosed by the larger upper first or primary single metal loop 12, then a current is induced in the larger upper first or primary single metal loop 12. The flux is directed through the loop area by coupling along the surface of the permeable magnetic metal, item 42. The magnetic field can be coupled directly to the cross sectional area of the loop without the use of the permeable metal. However, the permeable magnetic metal increases the amount of flux that can be linked in the upper loop cross sectional area. The coupled flux travels on the surface of the permeable magnetic metal and exists at the bottom of the upper loop, shown as flux line 58.

In the upper loop, Ampere's circuital law applies to the current $I_L$ and the magnetic field coupled through the loop area (see FIG. 7, area 46). The magnetic field cuts through area 46 and induces a current in the upper first or primary single metal loop 12 enclosing the area 46 by the following equations:

$$\oint_C (\nabla \times H) \cdot ds = \int_S J \cdot dS$$

-continued $$\oint_C (\nabla \times H) \cdot ds = I_L$$

The magnetic field H is the field perpendicular to the cross sectional area 46, shown in FIGS. 7 and 8. The integral of this magnetic field must be computed numerically because the H-field is not constant on the closed path that circles the current loop $I_L$. The equation is shown to give the general theory of operation of the loop link. This equation shows that the magnetic field link in the cross sectional area that the aluminum pair of spaced apart electrically conductive connecting arms 14 encircles produces a current $I_L$ in the pair of spaced apart electrically conductive connecting arms 14.

Electrical connections are not needed between the tire pressure sensor and the wheel hub coil. Hence, this uses a more reliable method to communicate with the tire pressure sensor. The simplicity of the design makes it much easier to produce. The design is also lower cost. The design can also be made strong by using thicker sheet metal so that it can withstand the harsh environment in the airplane wheel. The design is non-contact since the coupling device does not contact the wheel hub coil.

The loop link was successfully demonstrated on a 787 main wheel rim half in a Crane Aerospace & Electronics laboratory coupling between the 83-202-01 tire pressure sensor and the axle remote data concentrator 142-12922 at Lynnwood, Wash.

Figure 9:
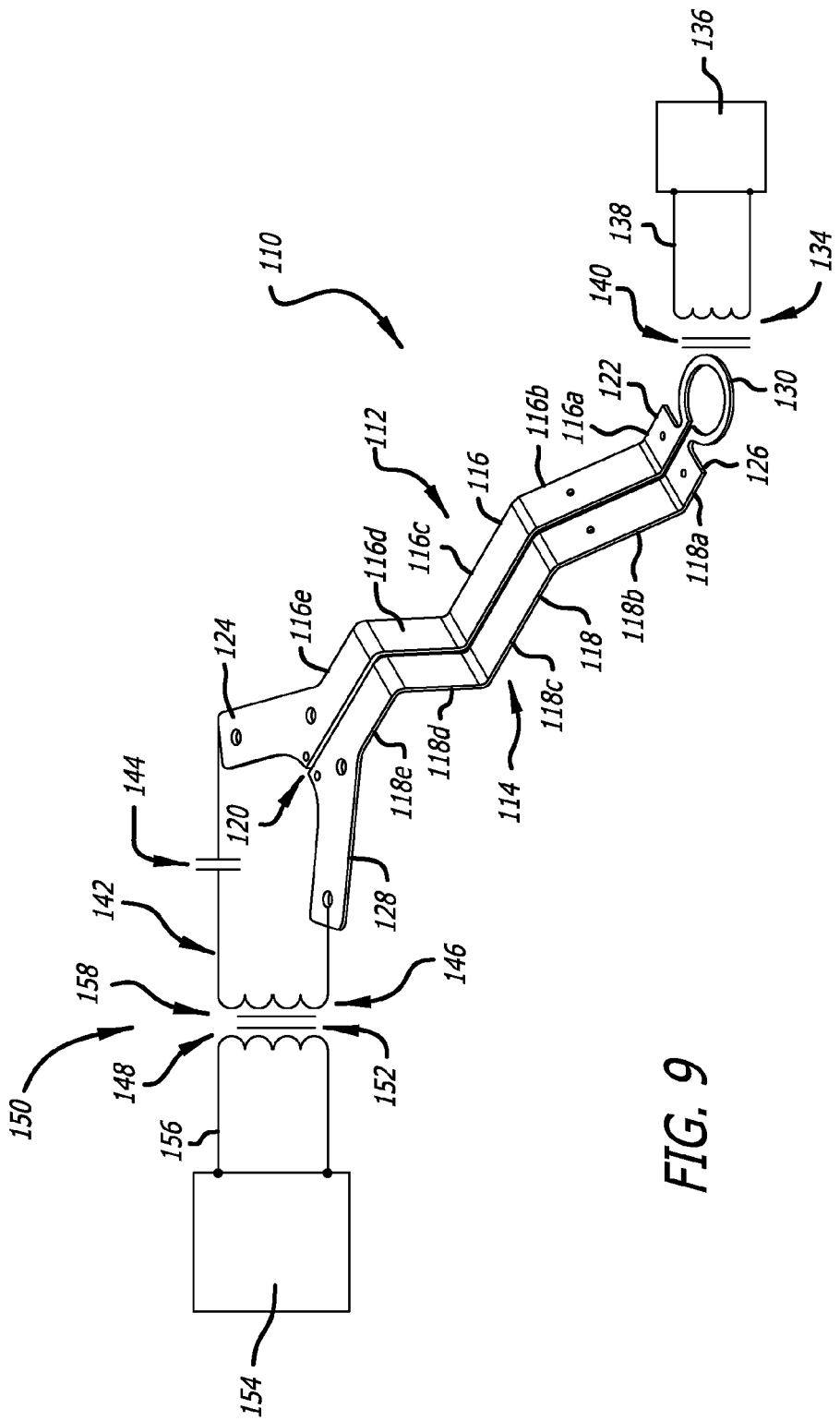
FIG. 9 is a functional, schematic diagram of an aircraft resonant loop link assembly according to the present invention.
Figure 10:
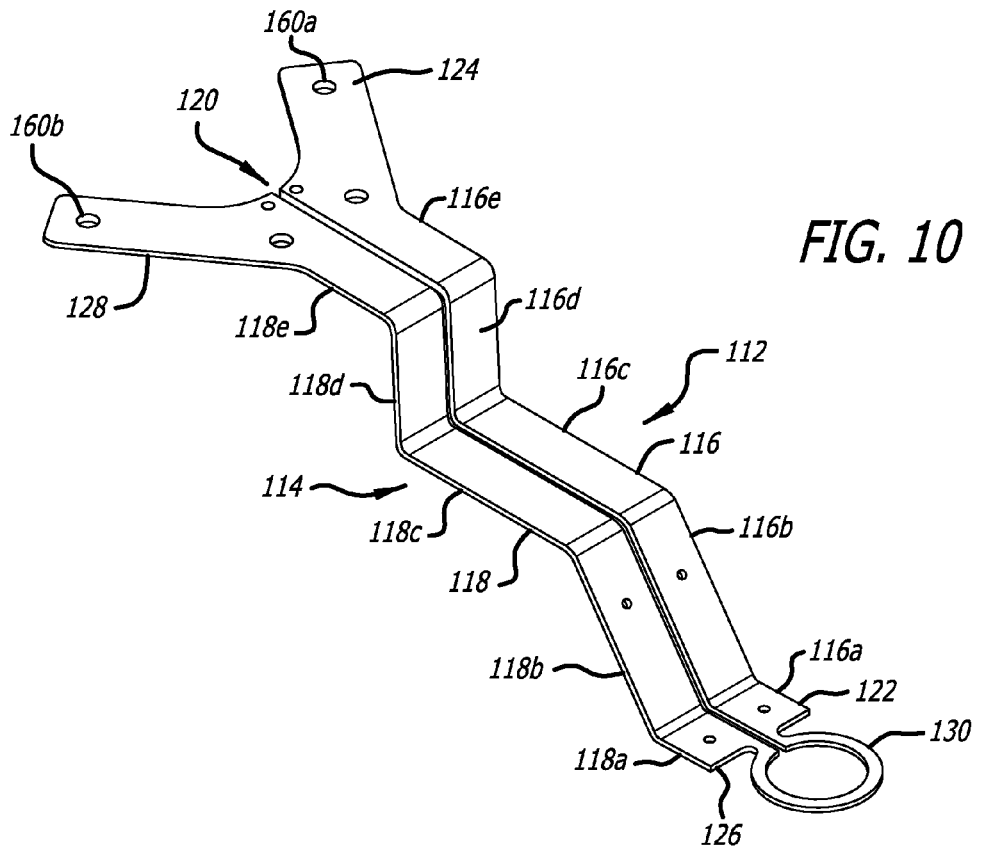
FIG. 10 is a top perspective view of the rigid loop link including first and second electrically conductive connecting arms of the aircraft resonant loop link assembly of FIG. 9.

Referring to FIGS. 9-14, in another presently preferred embodiment, the present invention provides for a resonant loop link assembly 110 including a rigid loop link 112 with a rigid pair of spaced apart electrically conductive connecting arms or shafts 114, including parallel spaced apart metal arms or shafts 116, 118, as shown in FIGS. 9 and 10. The first arm or shaft is typically formed of a plurality of stepped sections or segments 116*a, b, c, d, e,* and the second arm or shaft is likewise typically formed of a corresponding plurality of stepped sections or segments 118*a, b, c, d, e,* as will be further explained hereinbelow. The parallel spaced apart metal arms or shafts are preferably closely spaced apart, separated by a small gap 120. The first arm or shaft includes a first end 122 and a second end 124, and the second arm or shaft includes a first end 126 and a second end 128. The first ends of the first and second shafts preferably extend to form and be electrically connected to a single primary metal loop 130, typically a single turn or loop, which can be stamped from sheet metal, for example, and which is typically retained in a bracket 132, illustrated in FIG. 12.

Referring again to FIG. 9, the single primary metal loop is preferably configured to be mounted adjacent to and in close proximity to a secondary tire pressure sensor coil 134 that is electrically connected to a tire pressure sensor 136 by electrical connectors 138, such as wires or cables, for example. A transformer core 140 preferably is disposed between the single primary metal loop and the secondary tire pressure sensor coil, and is preferably formed of permeable material that increases the coupling coefficient between the single primary metal loop and the secondary tire pressure sensor coil, and is also preferably coaxial with the single primary metal loop and the secondary tire pressure sensor coil.

The second ends of the first and second arms or shafts are preferably electrically connected with a tuned resonant circuit 142 including at least one series resonant tuning capacitor 144 and a hubcap secondary coil 146 that is preferably formed of one, two or three turns or loops, and that preferably is configured to rotate with the wheel. While for purposes of manufacturing, it is currently preferred to form the hubcap secondary coil with 1 turn or loop, it has been found that the best power-up performance of the tire pressure sensor occurs when the hubcap secondary coil is provided with 2 turns or loops.

The one or more turns or loops of the hubcap secondary coil are preferably disposed adjacent to an axle adapter transformer primary coil 148, and the hubcap secondary coil and axle adapter transformer primary coil together form a coaxial resonant coil pair 150, with the hubcap secondary coil and axle adapter transformer primary coil having a radial gap 152 therebetween. The axle adapter transformer primary coil of the resonant coil pair preferably is configured to be electrically connected with a control electronics unit 154 that is typically located in an electronics bay of the aircraft up to 250 feet away, such as by a cable 156, which can be a coaxial or twisted pair cable, for example. The coaxial resonant coil pair preferably includes a transformer core 158 formed of magnetically permeable material disposed in the radial gap between the hubcap secondary coil and the axle adapter transformer primary coil. The transformer core preferably is also coaxial with the hubcap secondary coil and the axle adapter transformer primary coil, and operates to focus the magnetic flux between the hubcap secondary coil and the axle adapter transformer primary coil, to increase the coupling coefficient between the hubcap secondary coil and the axle adapter transformer primary coil.

Figure 11:
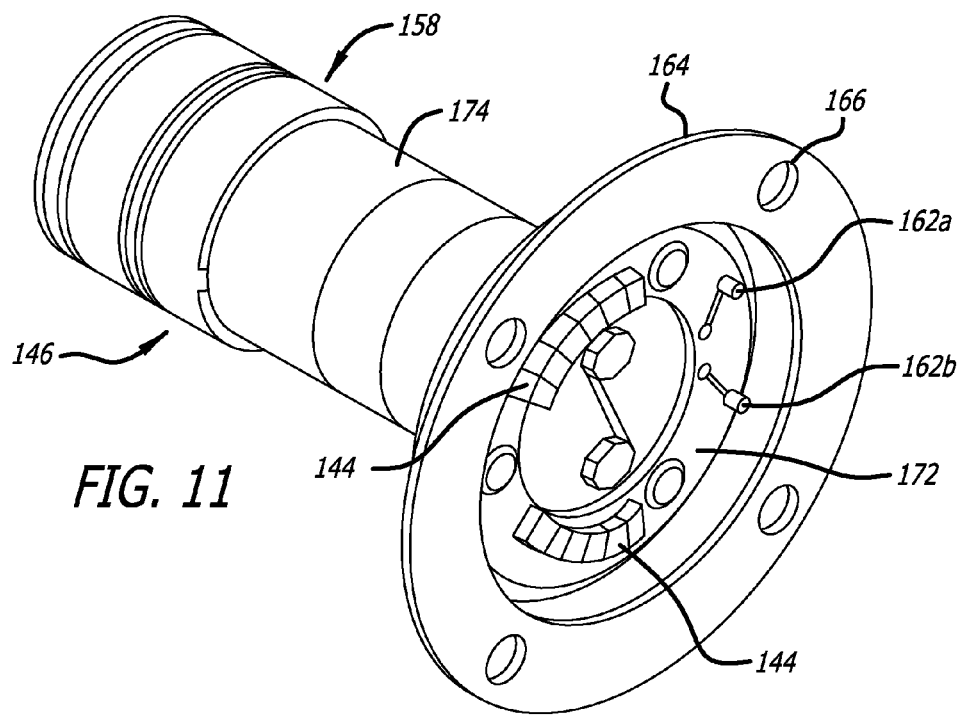
FIG. 11 is a perspective view of a portion of aircraft resonant loop link assembly of FIG. 9.

Referring to FIGS. 10-11, the second ends of the first and second spaced apart electrically conductive connecting arms or shafts preferably include connector receptacles 160a, 160b that are rigidly electrically connected to connector pins 162a, 162b that are electrically connected to the tuned resonant circuit and hubcap secondary coil, so that the pair of spaced apart electrically conductive connecting arms or shafts are rigidly electrically connected between the single primary metal loop and the tuned resonant circuit connected to hubcap secondary coil.

Figure 12:
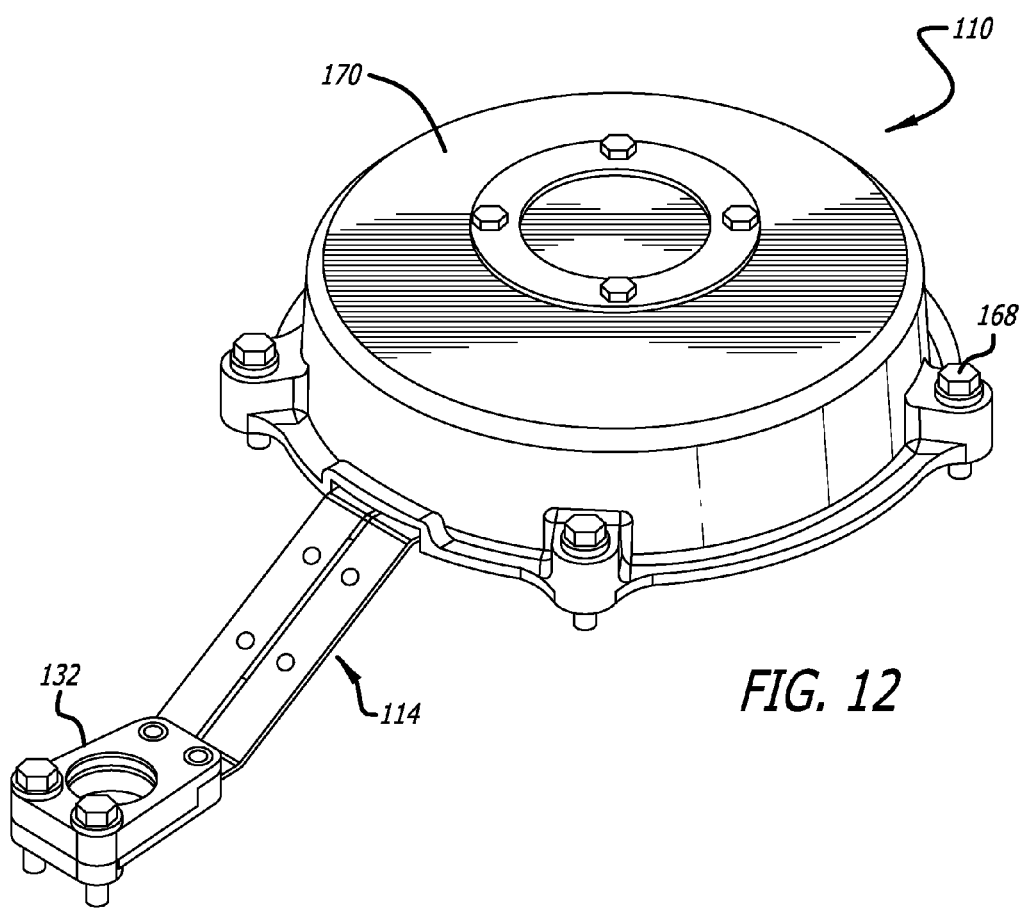
FIG. 12 is a top perspective view of a portion of aircraft resonant loop link assembly of FIG. 9.
Figure 13:
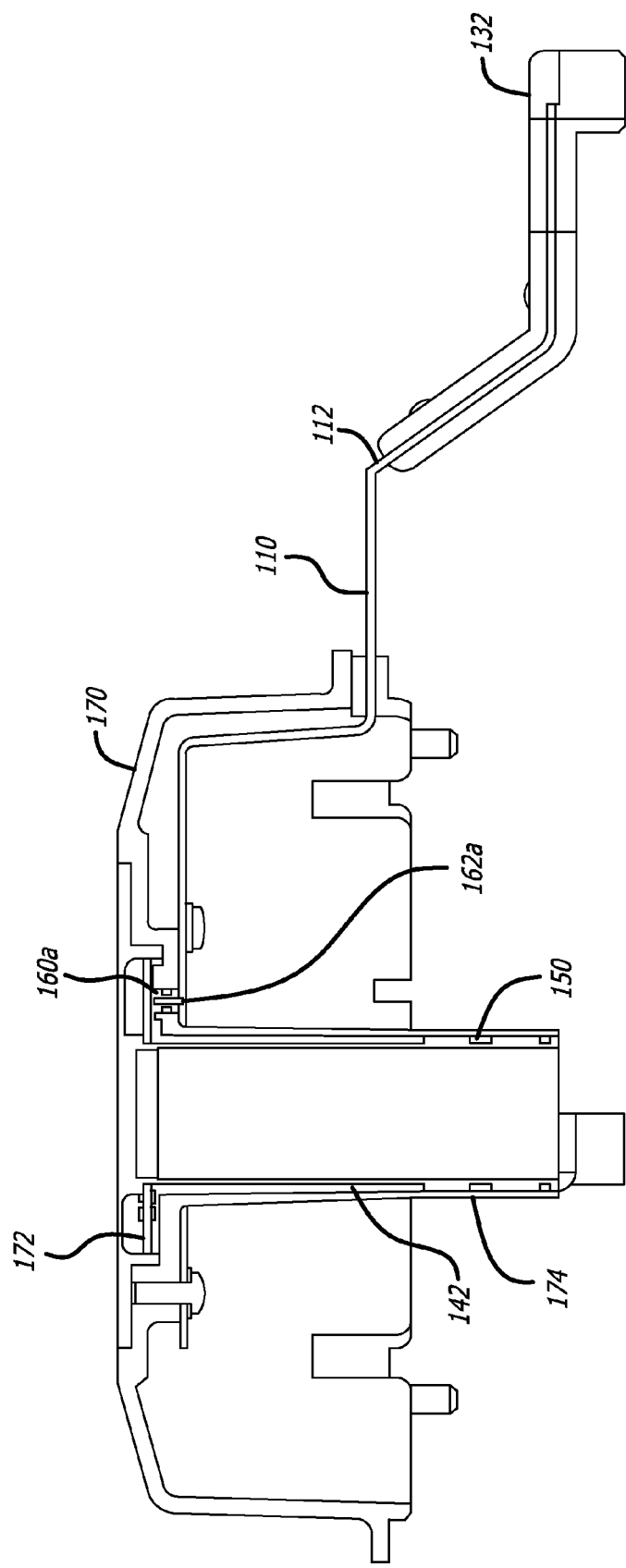
FIG. 13 is a cross-sectional view of a variation of the aircraft resonant loop link assembly of FIG. 9.
Figure 14:
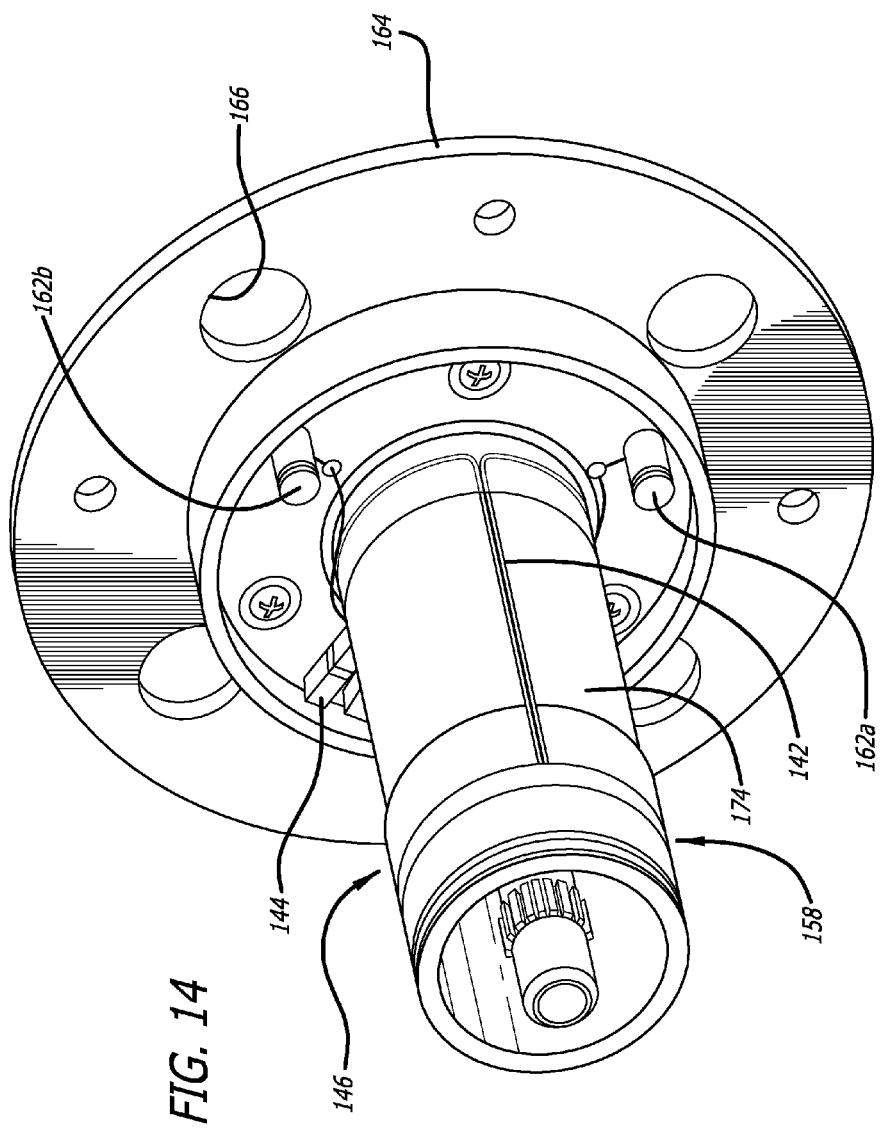
FIG. 14 is a perspective view of the aircraft resonant loop link assembly of FIG. 13.

Referring to FIGS. 11-14, a wheel hubcap 164 includes mounting holes 166 for bolts 168 for securing the wheel hubcap to a wheel axle cover 170, and an interior connector printed wiring board, mounting plate or ring 172 including the tuned resonant circuit with one or more series resonant tuning capacitors, which can be stacked in parallel, for example. As is illustrated in FIGS. 11-13, the plurality of stepped sections or segments of the parallel spaced apart metal arms or shafts allow the parallel spaced apart metal arms or shafts to extend within the wheel hubcap and wheel axle cover to be rigidly electrically connected to connector pins that are electrically connected to the tuned resonant circuit and hubcap secondary coil. The one or more turns or loops of the hubcap secondary coil preferably are mounted to a protective coil mounting shaft, funnel or nozzle 174 connected to and extending from the wheel hubcap along the direction of the wheel axle, and the one or more turns or loops of the hubcap secondary coil preferably are connected by wiring of the tuned resonant circuit extending along the protective coil mounting shaft, funnel or nozzle to the other components of the tuned resonant circuit, as shown in FIGS. 13 and 14.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. An aircraft resonant loop link assembly for electromagnetically coupling a magnetic field between a wheel axle electromagnetic adapter transformer primary coil and a tire pressure sensor receiver coil spaced apart from the wheel axle electromagnetic adapter transformer primary coil for powering a tire pressure sensor, the aircraft resonant loop link assembly comprising:
   a first electrically conductive connecting arm having first and second ends;
   a second electrically conductive connecting arm having first and second ends, said second electrically conductive connecting arm being spaced apart from said first electrically conductive connecting arm;
   a single electrically conductive primary loop electrically connected to said first ends of said first and second electrically conductive connecting arms, said single electrically conductive primary loop being configured to be mounted adjacent to a secondary tire pressure sensor coil;
   a circuit including at least one resonant tuning capacitor and a secondary coil including at least one electrically conductive loop electrically connected to said second ends of said first and second electrically conductive connecting arms, said second ends of said first and second electrically conductive connecting arms being connected in series to said circuit, said secondary coil being configured to be mounted adjacent to a wheel axle electromagnetic adapter transformer primary coil;
   said first and second electrically conductive connecting arms being electrically connected between said single electrically conductive primary loop and said secondary coil, said first and second electrically conductive connecting arms being configured to carry current generated in the secondary coil from a wheel axle electromagnetic adapter transformer primary coil to the secondary coil, said first and second electrically conductive connecting arms being configured to carry current induced in the primary loop a predetermined distance from the wheel axle electromagnetic adapter transformer primary coil to the secondary coil, to generate flux in the tire pressure sensor receiver coil for powering a tire pressure sensor.

2. The aircraft resonant loop link assembly of claim 1, wherein said first and second electrically conductive connecting arms are parallel.

3. The aircraft resonant loop link assembly of claim 1, wherein said first and second electrically conductive connecting arms are separated by a small gap.

4. The aircraft resonant loop link assembly of claim 1, wherein said first and second electrically conductive connecting arms are rigid.

5. The aircraft resonant loop link assembly of claim 1, wherein said first electrically conductive connecting arm is formed of a plurality of stepped sections.

6. The aircraft resonant loop link assembly of claim 1, wherein said second electrically conductive connecting arm is formed of a plurality of stepped sections.

7. The aircraft resonant loop link assembly of claim 1, wherein said first and second electrically conductive connecting arms are formed of a metal.

8. The aircraft resonant loop link assembly of claim 1, wherein said first and second electrically conductive connecting arms are formed of a metal having low magnetic permeability.

9. The aircraft resonant loop link assembly of claim 7, wherein said metal is selected from the group consisting of aluminum and titanium.

10. The aircraft resonant loop link assembly of claim 8, wherein said metal is selected from the group consisting of aluminum and titanium.

11. The aircraft resonant loop link assembly of claim 1, wherein said electrically conductive primary loop is formed of metal.

12. The aircraft resonant loop link assembly of claim 1, wherein said electrically conductive primary loop and said secondary tire pressure sensor coil form a tire pressure sensor coil pair.

13. The aircraft resonant loop link assembly of claim 12, wherein said tire pressure sensor coil pair includes a transformer core disposed between said electrically conductive primary loop and said secondary tire pressure sensor coil.

14. The aircraft resonant loop link assembly of claim 13, wherein said transformer core is formed of magnetically permeable material.

15. The aircraft resonant loop link assembly of claim 1, wherein said at least one electrically conductive loop of said secondary coil comprises two conductive loops.

16. The aircraft resonant loop link assembly of claim 1, wherein said at least one electrically conductive loop of said secondary coil comprises three conductive loops.

17. The aircraft resonant loop link assembly of claim 1, wherein said at least one electrically conductive loop of said secondary coil is formed of metal.

18. The aircraft resonant loop link assembly of claim 1, wherein said at least one electrically conductive loop of said secondary coil and the wheel axle electromagnetic adapter transformer primary coil together form a resonant coil pair, and said resonant coil pair is electrically connected with a control electronics unit.

19. The aircraft resonant loop link assembly of claim 18, wherein a transformer core is disposed in said resonant coil pair between said at least one electrically conductive loop of said secondary coil and the wheel axle electromagnetic adapter transformer primary coil.

20. The aircraft resonant loop link assembly of claim 18, wherein said transformer core disposed in said resonant coil pair is formed of magnetically permeable material.

\* \* \* \* \*